May 25, 1937. L. E. LA BRIE 2,081,590

BRAKE

Filed Aug. 12, 1935 2 Sheets-Sheet 1

INVENTOR.
LUDGER E. LA BRIE
BY A. E. Wilson
ATTORNEY

May 25, 1937.　　　L. E. LA BRIE　　　2,081,590
BRAKE
Filed Aug. 12, 1935　　　2 Sheets-Sheet 2

INVENTOR.
LUDGER E. LA BRIE
BY　A. E. Wilson.
ATTORNEY

Patented May 25, 1937

2,081,590

UNITED STATES PATENT OFFICE 2,081,590

BRAKE

Ludger E. La Brie, South Bend, Ind., assignor to Bendix Products Corporation, South Bend, Ind., a corporation of Indiana Application August 12, 1935, Serial No. 35,789

10 Claims. (Cl. 188—78)

This invention relates to brakes and more particularly to mechanical brakes of the non-self actuating type, wherein a plurality of brake shoes are urged into engagement with a brake drum by means of wedging members interposed between the actuating member and the brake shoes.

An object of the invention is to provide improved means for positively actuating the brakes regardless of the direction of rotation of the vehicle wheel.

A further object is to provide improved means including a pinion operable to rotate a toothed sector to actuate wedging means to apply the brakes.

A still further object is to provide novel means for anchoring the brake actuating mechanism.

Another object of the invention is to provide a brake structure wherein the same amount of braking effort is required to apply the brakes to an equal extent, in both forward and reverse braking.

A further object of the invention resides in the provision of a three-shoe brake wherein each of the shoes are urged radially with an equal force.

Another object of the invention is to provide a novel brake mechanism of the self equalizing type.

A further object of the invention is to provide brake shoe actuating mechanism wherein opposite ends of the brake shoes are urged radially outwardly with a uniform force upon actuation of the brake applying mechanism.

Other objects and advantages of this invention will be apparent from the following detailed description, taken in connection with the accompanying drawings, submitted for purposes of illustration only and not intended to define the scope of the invention, reference being had for that purpose to the subjoined claims.

In the drawings, wherein similar reference characters refer to similar parts throughout the several views.

Figure 1:
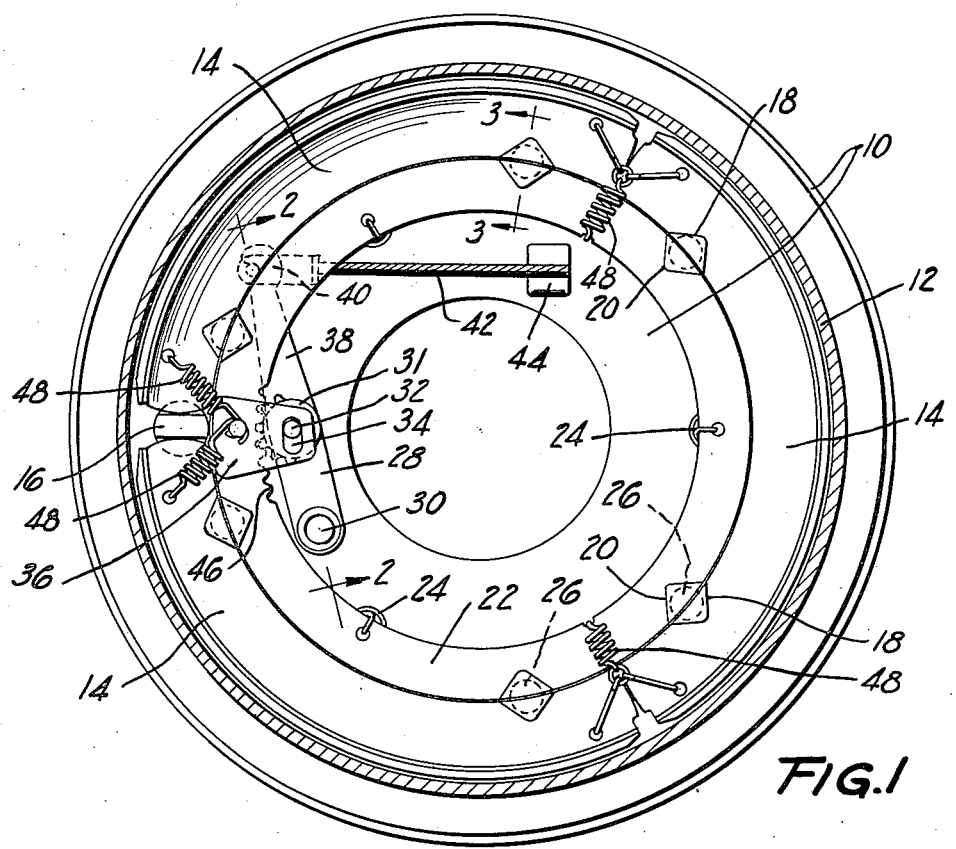
Figure 1 is a side elevation of a brake structure embodying the present invention.

Referring more particularly to Figure 1, there is shown a vehicle brake including a backing plate 10, a rotatable brake drum 12, and a plurality of brake shoes 14. A stationary anchor 16 is fixed in the backing plate 10, and is interposed between a pair of the brake shoes 14. The ends of the brake shoes 14 are rounded and are adapted to engage each other during normal operation of the brake.

Each of the brake shoes 14 is provided with a pair of indentations or grooves 18 at opposite ends thereof adapted to cooperate with similar indentations or grooves 20 carried by a disc 22 floatingly mounted upon the backing plate 12 and held in fixed relation thereto by means of springs 24. The indentations 18 and 20 receive ball members 26 interposed therebetween. The balls 26 act as wedges to urge the brake shoes 14 into engagement with the brake drum 12 upon rotation of the disc 22.

Figures 2, 3:
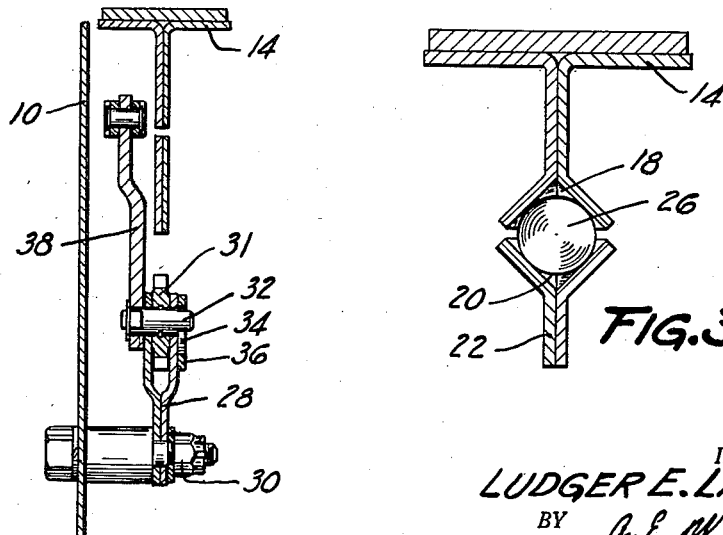
Figure 2 is a view taken on the line 2—2 of Figure 1.
Figure 3 is a view taken on the line 3—3 of Figure 1, showing a part of the brake actuating structure.

The disc 22 is rotated with respect to the brake shoes 14 through a mechanism including a link 28, one end of which is rotatably mounted with respect to the backing plate 10 at the point 30. The other end of the link 28 is bifurcated, as shown more clearly in Figure 2, to receive the toothed sector 31. The toothed sector 31 is keyed or otherwise fixed to a stud 32 rotatably mounted in the bifurcated end of the link 28. The stud 32 is received within a slot 34, positioned in a stamping 36, welded or otherwise fixed to the disc 22. The other end of the stud 32 is keyed to or otherwise fixed with respect to an actuating lever 38. The actuating lever 38 is provided with a hooked section 40, adapted to receive one end of a flexible cable 42, passing through the backing plate 10 at 44 and extending to a manually controlled brake actuating mechanism (not shown).

The toothed sector 31 meshes with a series of teeth 46 formed in inner surface of the disc 22. The brake shoes 14 are drawn out of engagement with the brake drum 12 by means of a plurality of springs 48 interconnected between the ends of the brake shoes 14 and the inner section of the disc 22 to effect disengagement of the brakes.

The operation of this device is as follows. To apply the brake the operator actuates the brake applying mechanism (not shown) thereby exerting tension through the flexible cable 42 to rotate the actuating lever 38 in the clockwise direction as viewed in Figure 1. Rotation of the lever 38 carries with it the toothed sector 31 meshing with the teeth 46 formed in the disc 22. The disc 22 is thereby rotated in the clockwise direction as viewed in Figure 1. As the indentations 20 formed in the disc 22 move with respect to the indentations 18 formed in the brake shoes 14, a wedging action is exerted through the ball members 26 positioned between the indentations 18 and 20.

The brake shoes 14 are prevented from rotation with the disc 22 by means of contact between the end of one of the brake shoes 14 and the anchor member 16. A wedging action is therefore exerted between the brake shoes 14 and the disc 22 whereupon the brake shoes 14 are urged outwardly into engagement with the brake drum 12 to effect an application of the brakes. To release the brakes the operator releases the brake actuating mechanism (not shown) whereupon the return springs 48 connected to the ends of the brake shoes 14 withdraw the brake shoes 14 from the brake drum 12.

It will be observed that the teeth of the sector 31 are held in mesh with the teeth 46 on the disc 22 by means of the stamping 36 fixed to the disc 22. The slot 34 formed in the stamping 36 receives one end of the stud 32 and prevents radial movement of the toothed sector 31. The slot 34 is of suitable length to permit sufficient movement of the stud 32 to normally apply the brakes and to permit of sufficient adjustment to compensate for normal wear of the friction lining. The toothed sector 31 and the stud 32 are prevented from travelling with the disc 22 by means of the bifurcated link 28, one end of which is fixed to the backing plate 10 at the point 30. Positive and simple actuating means are thus provided to actuate the brakes.

It will be apparent that this invention incorporates novel means for applying the brakes of a vehicle in such a manner that uniform pressure will be exerted over the entire periphery of the brake shoe, and simple and positive means are employed to effect the actuation of the brakes.

Figure 4:
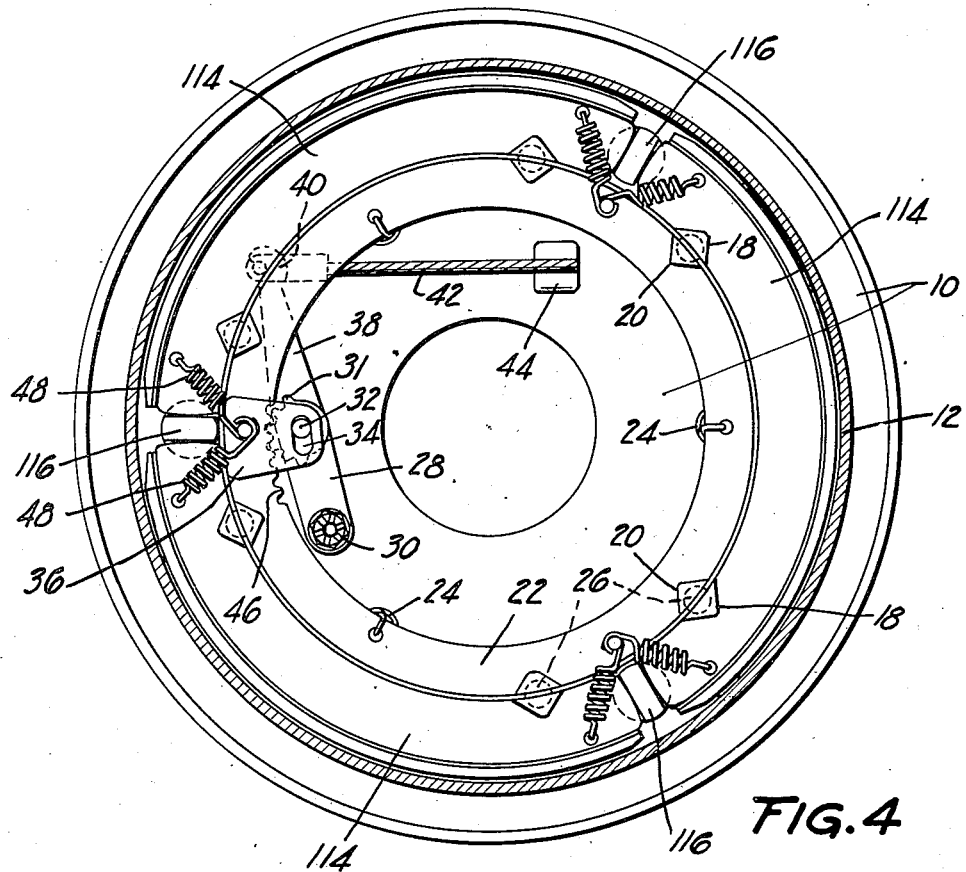
Figure 4 is a view similar to Figure 1, showing a modified form of the invention.

The embodiment of the invention illustrated in Figure 4 is similar in many respects to the preferred embodiment illustrated in Figure 1. It will be noted, however, that brake anchor members 116 are provided between each pair of brake shoes 114. The operation of this device is similar in many respects to the operation of the preferred embodiment. It will be observed, however, that while in the preferred embodiment, the thrust is transferred through the abutting ends of the brake shoes, in the embodiment illustrated in Figure 4 the thrust of each of the brake shoes 114 is exerted upon separate anchor members 116.

While the invention has been described with particular reference to two specific embodiments thereof, it is not intended to limit the scope of the invention to the details of construction described and illustrated, as various modifications may be made in the specific structure without departing from the terms of the following claims.

I claim:

1. A brake actuating device including a plurality of brake shoes, a circular disc positioned within the brake shoes, a plurality of cooperating indentations between opposite ends of the brake shoes and the disc, wedging means positioned in the cooperating indentations, and means supported jointly by the backing plate and disc to rotate the rotatable disc.

2. A brake actuating device including a plurality of brake shoes, a circular disc having a toothed inner section positioned within the brake shoes, a plurality of cooperating indentations between opposite ends of the brake shoes and the disc, wedging means positioned in the cooperating indentations, and means including a toothed sector carried jointly by the backing plate and disc and adapted to engage the toothed section of the circular disc to rotate the rotatable disc to apply the brakes.

3. In a vehicle brake, a brake drum, a stationary backing plate, a plurality of brake shoes, a rotatable disc positioned within the brake shoes, cooperating indentations between the brake shoes and the rotatable disc, wedging means positioned in the cooperating indentations, and means supported jointly by the backing plate and disc to rotate the rotatable disc to actuate the wedging means to move the brake shoes into engagement with the brake drum.

4. A vehicle brake including a brake drum, a stationary backing plate, a plurality of brake shoes, a rotatable disc having a toothed section positioned within the brake shoes, cooperating indentations between the brake shoes and the rotatable disc, wedging means positioned in the cooperating indentations, and means including a toothed sector supported by the backing plate and disc to mesh with the toothed section of the rotatable disc to rotate the rotatable disc to actuate the wedging means to move the brake shoes into engagement with the brake drum.

5. A vehicle brake having a backing plate, a brake drum, a plurality of brake shoes, an anchor member fixed to the backing plate and adapted to prevent rotation of the brake shoes in either direction, a circular disc having a toothed sector positioned within the brake shoes, wedging means between the circular disc and brake shoes, and means including a pinion anchored with respect to the backing plate and disc by a pivoted link and a fixed stamping including a lost motion connection to engage the toothed sector to rotate the circular disc to move the brake shoes into engagement with the brake drum.

6. A vehicle brake having a backing plate, a brake drum, a plurality of brake shoes, an anchor member fixed to the backing plate and adapted to prevent rotation of the brake shoes in both directions, a circular disc having a toothed sector positioned within the brake shoes, wedging means including a plurality of cooperating indentations formed in opposite ends of each brake shoe and the circular disc and ball members positioned in the indentations and means including a pinion anchored to the backing plate by a link and held into engagement with the toothed sector by a stamping including a slot carried by the disc to rotate the circular disc to move the brake shoes into engagement with the brake drum to apply the brakes.

7. In a brake actuating device a plurality of brake shoes, a backing plate, a brake drum, a circular disc having a toothed sector, wedging means between the circular disc and brake shoes adapted to urge the brake shoes into engagement with the brake drum upon rotation of the circular disc, a gear wheel adapted to mesh with the toothed sector of the circular disc, means to prevent the gear wheel from travelling with the circular disc and means to prevent radial movement of the gear wheel with respect to the circular disc.

8. An actuating device for a brake including a plurality of brake shoes, a backing plate, a brake drum, a circular disc having a toothed sector, wedging means between the circular disc and brake shoes adapted to urge the brake shoes into engagement with the brake drum upon rotation of the circular disc, a gear wheel adapted to mesh with the toothed sector of the circular disc, means including a link fixed to the backing plate to prevent the gear wheel from travelling with the circular disc and means including a member provided with a lost motion connection fixed to the circular disc to prevent radial movement of the gear wheel with respect to the circular disc.

9. A three shoe brake having a brake drum and a backing plate, a single anchor member fixed to the backing plate to prevent rotation of the brake shoes with respect to the backing plate, each of the shoes having a circular end section to engage the anchor member or the end section of adjacent shoes, a circular disc positioned within the brake shoes, wedging means between the brake shoes and the circular disc operable to urge the brake shoes into engagement with the brake drum upon rotation of the circular disc, yielding means to withdraw the brake shoes from engagement with the brake drum, and means to rotate the circular disc.

10. A three shoe brake having a brake drum and a backing plate, three anchor members fixed to the backing plate to prevent rotation of the brake shoes with respect to the backing plate, each of the shoes having a circular end section to engage the anchor members, a circular disc positioned within the brake shoes, wedging means between the brake shoes and the circular disc operable to urge the brake shoes into engagement with the brake drum upon rotation of the circular disc, yielding means to withdraw the brake shoes from engagement with the brake drum, and means to rotate the circular disc.

LUDGER E. LA BRIE.